(12) United States Patent  
Bongfeldt

(10) Patent No.: US 6,889,033 B2  
(45) Date of Patent: May 3, 2005

(54) INTELLIGENT GAIN CONTROL IN AN ON-FREQUENCY REPEATER

(75) Inventor: David Bongfeldt, Stittsville (CA)

(73) Assignee: Spotwave Wireless Inc., Ottawa (CA)

( * ) Notice: Subject to any disclaimer, the term of this patent is extended or adjusted under 35 U.S.C. 154(b) by 630 days.

(21) Appl. No.: 09/865,466

(22) Filed: May 29, 2001

(65) Prior Publication Data

US 2002/0045431 A1 Apr. 18, 2002

(30) Foreign Application Priority Data

Oct. 18, 2000 (CA) .................................................. 2323881

(51) Int. Cl.[7] .......................... H04B 7/15; H04B 7/185; H04Q 7/20
(52) U.S. Cl. ...................... 455/11.1; 455/13.4; 455/522; 455/15; 455/20; 455/24
(58) Field of Search .............................. 455/7, 9, 11.1, 455/13.4, 15, 17, 20, 21, 24, 522, 69, 127.2, 232.1–241.1

(56) References Cited

U.S. PATENT DOCUMENTS

| | | | | |
|---|---|---|---|---|
| 3,411,088 A | * | 11/1968 | Hutchison | 455/9 |
| 3,835,393 A | * | 9/1974 | Marron | 725/124 |
| 4,061,970 A | * | 12/1977 | Magneron | 455/14 |
| 4,754,495 A | * | 6/1988 | Kawano et al. | 455/17 |
| 4,776,032 A | * | 10/1988 | Odate et al. | 455/24 |
| 4,849,963 A | | 7/1989 | Kawano et al. | 370/30 |
| 5,095,528 A | * | 3/1992 | Leslie et al. | 455/10 |
| 5,564,074 A | | 10/1996 | Juntti | 455/67.1 |
| 5,812,933 A | * | 9/1998 | Niki | 455/16 |
| 5,812,951 A | | 9/1998 | Ganesan et al. | 455/445 |
| 5,815,795 A | | 9/1998 | Iwai | 455/9 |
| 5,937,332 A | | 8/1999 | Karabinis | 455/12.1 |
| 5,987,304 A | * | 11/1999 | Latt | 455/17 |
| 6,594,475 B1 | * | 7/2003 | Anvekar et al. | 455/277.1 |
| 6,671,502 B1 | * | 12/2003 | Ogawa | 455/127.1 |
| 6,681,100 B1 | * | 1/2004 | Ge | 455/78 |
| 6,687,509 B1 | * | 2/2004 | Schmutz et al. | 455/522 |

FOREIGN PATENT DOCUMENTS

| | | | | |
|---|---|---|---|---|
| EP | 0 724 336 A2 | 7/1996 | | H04B/1/38 |
| EP | 0 302 455 A2 | 8/1999 | | H04B/7/155 |

* cited by examiner

*Primary Examiner*—Duc M. Nguyen  
(74) *Attorney, Agent, or Firm*—Kent Daniels; Ogilvy Renault

(57) ABSTRACT

An intelligent gain controller operates to control the gain in each one of wideband uplink and downlink signal paths. Weak desired signals, within each wideband signal path, are detected using a narrowband down converter and detector, and these desired signals monitored by the micro controller. Based on the monitored signals, the micro controller operates, under control of suitable software implementing an Adaptive Control Algorithm, to adjust the gain in each of the uplink and downlink paths in order to dynamically optimize performance.

65 Claims, 5 Drawing Sheets

US 6,889,033 B2

INTELLIGENT GAIN CONTROL IN AN ON-FREQUENCY REPEATER

CROSS-REFERENCE TO RELATED APPLICATIONS

This application is related to the U.S. patent application Ser. No. 09/809,218, filed on Mar. 16, 2001.

MICROFICHE APPENDIX

Not Applicable.

TECHNICAL FIELD

The present application relates to wireless access networks and, in particular, to a method and system for enabling Intelligent Gain Control (IGC) in an on-frequency repeater.

BACKGROUND OF THE INVENTION

In the modern communications space, wireless access networks are increasingly popular, as they enable subscribers to access communications services without being tied to a fixed, wireline communications device. Conventional wireless access network infrastructure (e.g., base stations) is typically "built out", by a network service provider, using a network-centric approach. Thus the build-out normally begins with major Metropolitan Service Areas (MSAs) using base stations located at the center of overlapping coverage areas or "cells". The build-out, and corresponding wireless communications services, subsequently migrates outward from the MSAs to areas of lower population/service densities (e.g., urban to suburban to rural, etc.). At some point, usually dictated by economics, the build-out slows and/or becomes spotty leaving many individual wireless subscribers with unreliable or non-existent service.

On-frequency repeaters are known in the art for improving wireless services within defined regions of a wireless network (e.g., within a building or a built-up area). Such on-frequency repeaters are typically provided by the wireless network provider in order to improve signal quality in high noise or attenuation environments, where signal levels would otherwise be too low for satisfactory quality of service. In some cases, a wireless network provider may install a repeater in order to improve service in an area lying at an edge of the coverage area serviced by a base station, thereby effectively extending the reach of the base-station.

Prior art repeaters are part of a network-centric view of the wireless network space, in that they are comparatively large systems provided by the network provider in order to improve wireless service to multiple subscribers within a defined area. As such, they form part of the network "build-out plan" of the network provider. These systems suffer the disadvantage in that an individual subscriber cannot benefit from the improved services afforded by the repeater unless they happen to be located within the coverage area of the repeater. However, there are many instances in which wireless subscribers may reside or work in areas where the coverage area of the wireless network is unreliable. Typical examples include mobile subscribers, and subscribers located in suburban and rural areas. Also, in-building coverage can be unreliable even within MSAs, depending on the size, location and construction of buildings and/or other obstacles. In such cases, it may be uneconomical for a network provider to build-out the network to provide adequate coverage area, thereby leaving those subscribers with inadequate wireless services.

Accordingly, Applicant's co-pending U.S. patent application Ser. No. 09/809,218, filed on Mar. 16, 2001 and entitled Adaptive Personal Repeater, the contents of which are incorporated herein by reference, provides a method and apparatus that enables an individual subscriber to cost-effectively access high quality wireless communications services, independently of the location of the subscriber. The Adaptive Personal Repeater (APR) transparently mediates signaling between a subscriber's wireless communications device (WCD) and a transceiver (base station) of a wireless communications network. The repeater includes a Directional Donor Unit (DDU) and a Subscriber Coverage Unit (SCU). The DDU maintains a network link with the base station of the wireless communications network. The SCU maintains a local link with the WCD within a personal wireless space of the APR. Total system gain is divided between and integrated with the DDU and the SCU, so that a separate gain and system control unit is not required. This division of system gain also enables high-performance on-frequency repeater functionality to be obtained without the use of high-cost components and building blocks.

As described in U.S. patent application Ser. No. 09/809,218, the APR represents a subscriber-centric solution for improving wireless services as required by one or more subscribers, and in a manner that is transparent to the network. However, in order to provide this functionality, it is necessary for the repeater to provide sufficient system gain in each of the uplink and downlink paths to compensate for propagation losses in these paths. On the other hand, if the gain (in either the uplink or downlink paths) is too high, the repeater will radiate unnecessarily high signal powers to the subscriber's WCD and/or the base station. In an environment in which there is more than one APR in use, radiation of excessive signal power in the downlink path can cause interference (in the form of multiple overlapping coverage areas) with other subscribers. The same holds true for a single APR radiating excessive power in the downlink path causing interference to other subscribers outside the personal wireless space. Similarly, radiation of excessive signal power to the base-station may cause interference with other base-stations and/or other users of the wireless communications network.

Automatic Gain Controllers (AGCS) capable of controlling signal gain are known in the art. Typically, AGCs are implemented as analog RF or IF circuits, in which a (voltage controlled) variable gain amplifier (VGA) is used to amplify the analog signal. The VGA is normally controlled by a voltage level of a control signal, which is usually generated (by a comparator) by comparing a measured parameter (e.g., a received signal power, or a bit error rate) to a predetermined threshold value. AGCs of this type are capable of providing reliable operation within the range of linear operation of the VGA. Typically, operation of the AGC becomes increasingly unreliable beyond the linear range of the VGA, and thus the performance of the AGC is typically limited by the linear range of the VGA. However, it is anticipated that successful operation of the repeater will require that system gain be controllable through a range of up to about 120 dB in both the uplink and downlink paths. This range of operation is well beyond the linear range of moderate-cost VGAs.

Another difficulty typically encountered in on-frequency repeaters is system oscillation resulting from imperfect isolation between the two antennas. Conventional on-frequency repeaters normally require that the total system gain must be about 10–15 db less than the antenna isolation in order to prevent oscillation. Typically, antenna isolation and system gain are adjusted by service personnel during installation and set-up of the repeater unit, in order to achieve satisfactory performance. However, this is a labor-intensive operation requiring skilled technicians using specialized equipment. This increases the cost and complexity of installing the repeater, and thereby greatly discourages individual subscribers from acquiring a repeater for their personal use.

Accordingly, a method and apparatus capable of automatically controlling gain throughout a wide operating range, in order to compensate for propagation losses and imperfect antenna isolation, at a moderate cost, remains highly desirable.

SUMMARY OF THE INVENTION

An object of the present invention is to provide an apparatus for automatically controlling gain throughout a wide operating range.

Accordingly, an aspect of the present invention provides an intelligent gain controller (IGC) adapted to control a gain of first and second wideband signal paths. The IGC comprises a respective automatic gain control (AGC) block and slaved Variable Gain Amplifier (VGA) disposed in each wideband signal path, a narrowband detector, and a micro controller. Each AGC is adapted to selectively amplify RF signals in the respective wideband signal path. The narrowband detector is adapted to detect respective RF signals within each of the first and second wideband signal paths. Finally, the micro controller operates to control each of the AGC blocks using the detected RF signals. The slaved variable gain amplifier of one wideband signal path is arranged to selectively amplify RF signals in the respective wideband signal path based on a signal power of RF signals in the other wideband signal path.

In preferred embodiments of the invention, each wideband signal path has a bandwidth corresponding to a respective network system bandwidth. For example, in North America, a bandwidth of 25 MHz may be suitably selected for each of the wideband signal paths.

In some embodiments, each AGC block includes a respective AGC Variable Gain Amplifier (VGA) and an AGC feedback loop. The AGC Variable Gain Amplifier (VGA) controllably amplifies RF signals in the respective wideband signal path in response to a gain control signal. The AGC feed-back loop supplies a feedback signal to the VGA as the gain control signal. Thus RF signals in the respective wideband signal path are controlled by the VGA in accordance with the feedback signal supplied by the AGC feed-back loop.

The AGC feed-back loop may include means for controlling a power level of the feedback signal supplied to the AGC VGA, using an AGC control set signal from the micro controller. The means for controlling the power level of the feedback signal may include a Variable Logarithmic Amplifier (VLA) operatively coupled to receive the AGC control set signal from the micro controller.

In some embodiments, the AGC feed-back loop also includes a coupler adapted to supply a sample of RF signals in the respective wideband signal path to the narrowband detector.

In some embodiments, the narrowband detector includes: a synthesizer, means for channeling RF signals from a selected one of the wideband signal paths using the synthesizer signal; and a detector unit. The synthesizer operates to generate a synthesizer signal having a selected frequency. The means for channeling RF signals processes the selected RF signals such that RF signals above or below the synthesizer signal frequency are channeled within a narrow pass-band centered on an intermediate frequency (IF), and isolated. Finally, the detector unit operates to detect a power level of the isolated RF signals at the intermediate frequency.

Preferably, the synthesizer is designed to select the frequency of the synthesizer signal using a synthesizer control signal from the micro controller. This enables the micro controller to progressively change the frequency of the synthesizer signal, while simultaneously monitoring the detected power level of the isolated RF signals to scan the entire bandwidth of each wideband signal path.

In some embodiments, the means for channeling RF signals includes: a switching input and a filter. The switching unit operates to select RF signals from one of the first and second wideband signal paths, while the filter attenuates a portion of the selected RF signals lying outside the narrow pass-band centered on the intermediate frequency (IF).

In preferred embodiments of the invention, the micro controller includes: a micro-processor operatively coupled to each of the AGCs and the narrowband detector; and software defining an Adaptive Control Algorithm for controlling operation of the micro-processor.

The software may include software code adapted to: monitor a power level of RF signals detected by the narrowband detector; compare the monitored power level to at least one threshold value; and determine an optimum gain in each one of the respective automatic gain control (AGC) blocks using the comparison result.

The software code for monitoring the power level of RF signals may also include software code designed to: monitor changes in the power level of the RF signals detected by the narrowband detector; and identify a signal format of the detected RF signals, using the monitored changes. The identified signal format may be used by the software to select the threshold value from among a predetermined set of threshold values.

The software code for monitoring the power level of RF signals may also include software code designed to decorrelate desired RF signals from undesired leakage signals within each of the wideband signal paths. This software code may be designed to: inject a predetermined unique code into a selected one of the wideband signal paths; detect a power level of the predetermined unique code in the monitored RF signal; and determine a proportion of leakage signals in the monitored RF signal using on the detected power level of the predetermined unique code in the monitored RF signal. The proportion of leakage signals in the monitored RF signals may then be used to adjust the optimum gain in each one of the respective automatic gain control (AGC) blocks.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The following description utilizes exemplary power levels, power ranges, channel frequencies and band-widths in order to illustrate various features of the present invention. Those skilled in the art will appreciate, however, that the present invention is by no means limited to such values. On the contrary, those skilled in the art will readily understand that the present invention can be deployed for use in conjunction with any wireless communications network, and it is to be expected that the power levels, power ranges, channel frequencies, and band-widths stated herein will be modified to conform to the requirements of the communications network in question. Such modifications are considered to be well within the purview of those of ordinary skill in the art, and lie within the intended scope of the appended claims.

Figure 1:
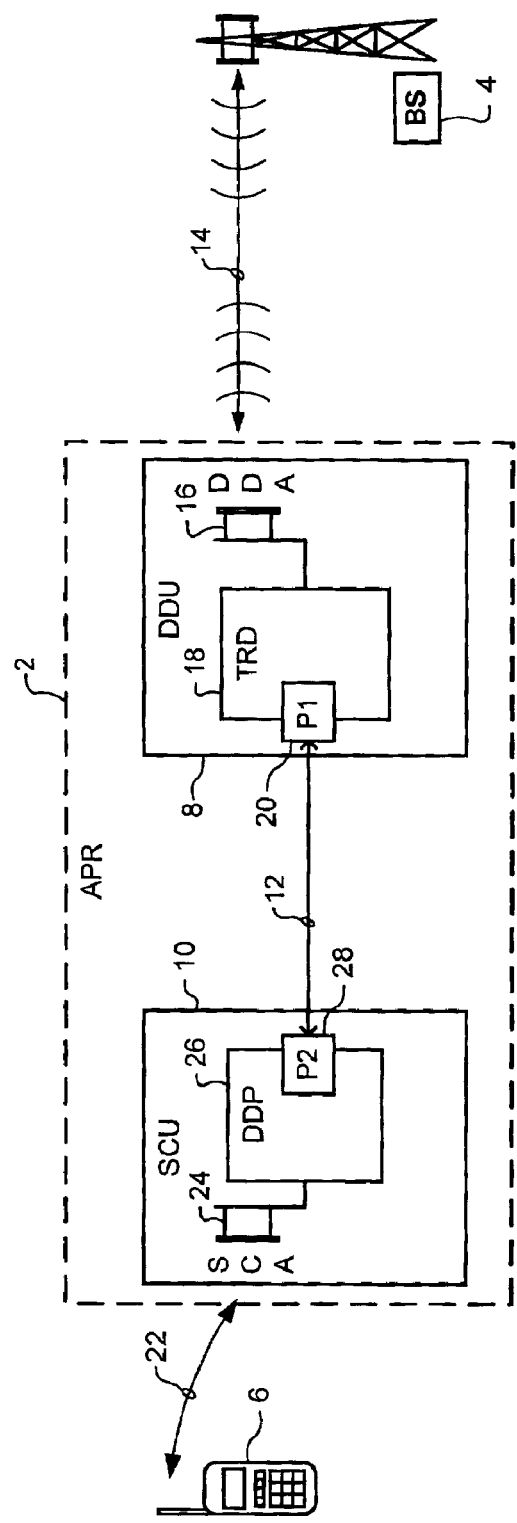
FIG. 1 is a block diagram schematically illustrating principle elements of an exemplary Adaptive Personal Repeater in which the present invention may be deployed.

The present invention provides an Intelligent Gain Controller (IGC) for use in an on-frequency repeater, such as, for example, an Adaptive Personal Repeater (APR) described in applicant's co-pending U.S. patent application Ser. No. 09/809,218. In general, an on-frequency repeater operates to mediate RF signal traffic between transceivers of the wireless communications network. Thus the APR creates a local wireless space encompassing one or more mobile transceivers (e.g., subscribers' wireless communications device(s)), and maintains a reliable fixed wireless link to a fixed transceiver (e.g., a base station) in order to "reach back" into the reliable coverage area of the wireless communications network to provide high quality wireless services in an otherwise poorly serviced area of the network. The IGC operates to control the gain of the repeater to facilitate reliable communications between the subscriber's wireless communications device(s) and the network, while mitigating potential interference. FIG. 1 is a block diagram schematically illustrating principle elements of an exemplary repeater in which the IGC of the present invention may be deployed.

As shown in FIG. 1, the repeater 2 is functionally positioned between a base station 4 of the wireless communications network (not shown) and the subscriber's Wireless Communications Device (WCD) 6. The repeater 2 is an "on-frequency" repeater, in that uplink and downlink RF signals are conveyed through the repeater 2 without altering the respective channel frequencies. The repeater 2 selectively receives and controls (i.e., amplifies and/or attenuates) RF signals, without performing any signal formatting or protocol conversion, thereby rendering the repeater 2 transparent to both the base station 4 and the WCD 6. The subscriber's WCD 6 may take the form of any conventional wireless communications device, such as, for example, Personal Digital Assistants (PDA's), wireless telephone handsets, pagers, and one and two-way wireless messaging devices.

It will be appreciated that the subscriber may possess multiple WCDs 6, and may use any one or more WCDs 6 simultaneously. Similarly, multiple subscribers may be located within the wireless space of a single repeater 2. However, for ease of description of the invention, the illustrated embodiment includes a single WCD 6 within the wireless space defined by the repeater 2.

In the embodiment of FIG. 1, the repeater 2 comprises a Directional Donor Unit (DDU) 8 and a Subscriber Coverage Unit (SCU) 10. The DDU 8 and SCU 10 may be suitably coupled to each other, for example via a coaxial cable 12, as shown in FIG. 1.

The Directional Donor Unit (DDU) 8 operates to establish and maintain a network link 14 between the repeater 2 and the base station 4. Preferably the DDU 8 is designed to receive downlink signals from the base station 4 at power levels as low as −120 dBm, and transmit uplink signals to the base station 4 at an ERP of up to +37 dBm. This transmit and receive performance of the DDU 8 enables maintenance of the network link 14 with the base station 4, even when the DDU 8 is located well beyond the conventional cell and/or network coverage area boundary. In the illustrated embodiment, the DDU 8 is provided as a single port active antenna comprising a Directional Donor Antenna (DDA) 16 integrated with a Transceiver Diplexer (TRD) 18. A bi-directional port 20 couples the DDU 8 to the SCU 10 via the coaxial cable 12.

The Subscriber Coverage Unit (SCU) 10 operates to maintain a local wireless link 22 between the repeater 2 and the subscriber's WCD 6, and define the wireless space (not shown) encompassing the WCD 6. It is anticipated that the coverage area of the wireless space will be very much smaller than a conventional cell of the wireless communications network. For example, in some embodiments, it is expected that the wireless space will extend 25 m (or less) from the SCU 10. Other embodiments may provide a larger or smaller coverage area, as desired.

In the illustrated embodiment, the Subscriber Coverage Unit (SCU) 10 is provided as a single port active antenna comprising a Subscriber Coverage Antenna (SCA) 24 integrated with a dual-directional processor (DDP) 26. A bi-directional port 28 couples the SCU 10 to the DDU 8 via the coaxial cable 12.

Figure 2:
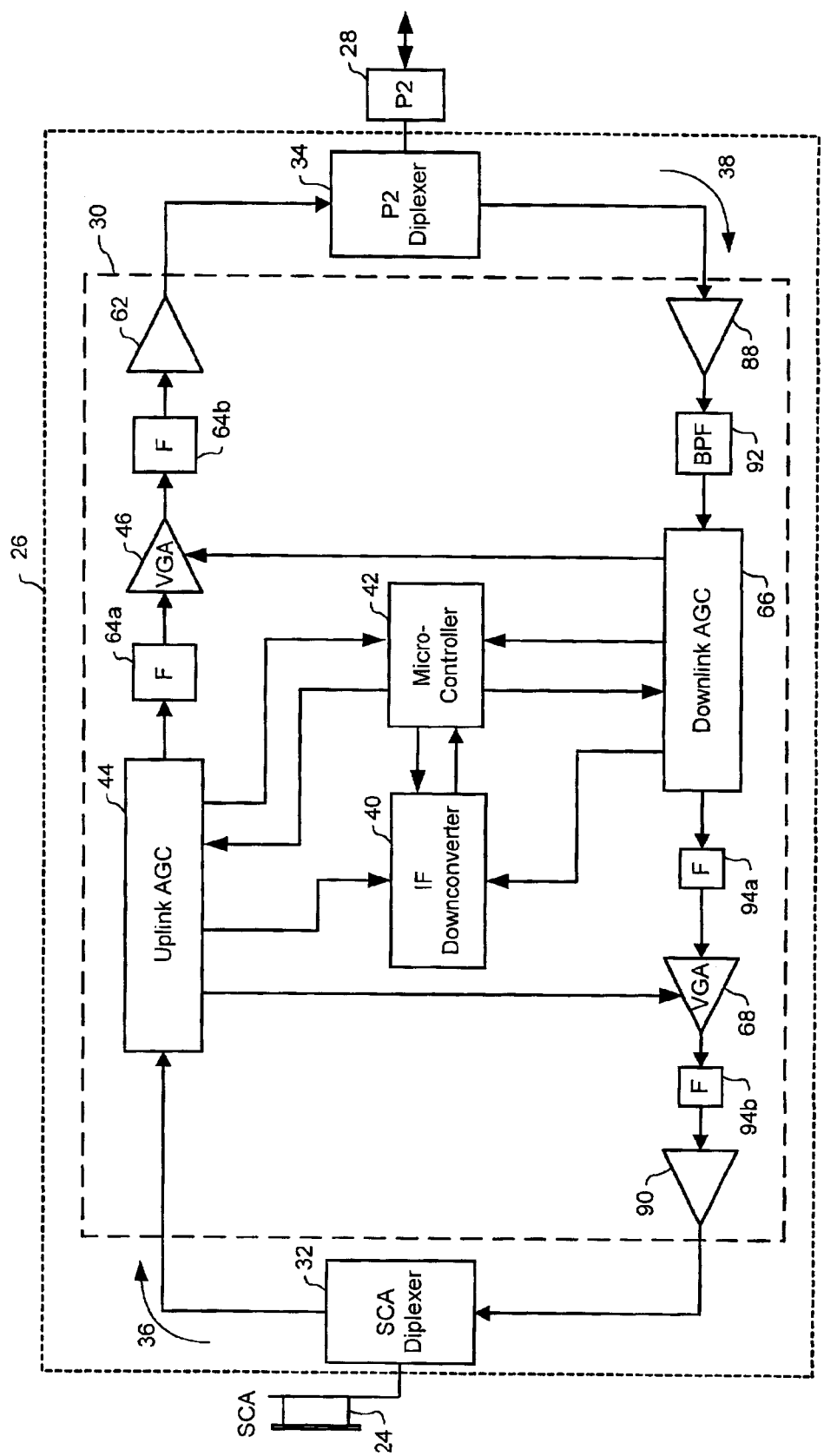
FIG. 2 is a block diagram schematically illustrating principle elements of an exemplary Intelligent Gain Controller (IGC) in accordance with an embodiment of the present invention.

In accordance with the present invention, the DDP 26 comprises an Intelligent Gain Controller (IGC) 30 connected between an SCA diplexer 32 and a port diplexer 34. As shown in FIG. 2, the SCA diplexer 32 is coupled to the SCA 24, and the port diplexer 34 is coupled to the bi-directional port 28. These diplexers 32 and 34 operate to separate uplink and downlink signal paths 36 and 38 at the SCA 24 and port 28, respectively. The diplexers 32 and 34 also operate to define and limit the frequency band(s) over which the IGC 30 must maintain stability.

As shown in FIG. 2, the IGC 30 is provided as a hybrid RF, analog and digital processing module capable of detecting and selectively controlling (i.e., amplifying and/or attenuating) RF signal traffic between the base station 4 and the WCD 6. The use of a hybrid processing module in this manner enables the IGC 30 to utilize mathematical (i.e., analog) signal conditioning and gain control techniques, in combination with knowledge-based (i.e., software) control of signal detection and system behaviour.

As shown in FIG. 2, the IGC 30 includes a wide-band uplink signal path 36 and a wide-band downlink signal path 38 coupled between the diplexers 32 and 34, and an IF down-converter and narrow-band detector 40, all of which are controlled by a micro controller 42 in accordance with an Adaptive Control Algorithm (ACA). Each of the uplink and downlink paths 36 and 38 are designed to control, condition and process RF signals within their respective wide-band uplink and downlink channels.

In general, the bandwidth of the wideband signal paths 36, 38 will be determined by the communications network, typically in accordance with published standards. For example, in North America, publicly accessible cellular communications networks utilize 25 MHz band-width uplink and downlink channels centered on 836.5 MHz and 881.5 MHz, respectively. Accordingly, for North American installations, the uplink and downlink signal paths 36 and 38 can be suitably designed to process RF signals within corresponding 25 MHz band-width channels. However, it will be appreciated that different band-widths, and different center frequencies, can be utilized, as desired.

In general, RF signal traffic received by the SCU 10 from the subscriber's WCD 6 is detected by the narrowband down-converter and detector 40, and used by the micro controller 42 to adapt the repeater 2 to the RF characteristics of the WCD 6 by acquiring appropriate uplink and downlink channel frequencies. Thereafter, the IGC 30 selectively controls RF signals within these uplink and downlink channel frequencies.

More particularly, the IGC 30 of the present invention operates to control uplink channel RF signals received from the WCD 6 with a widely varying received power (e.g., between 0 and −60 dBm) for transmission to the base station 4 with a substantially constant repeater uplink Effective Radiation Power (ERP). In this respect, the repeater uplink ERP can also be adjusted (by operation of the IGC 30) to a minimum value consistent with satisfactory link performance and prevention of system oscillation. However, following set-up of the network wireless link 14, it is anticipated that little, if any, adjustment in the repeater uplink ERP will be required, at least within the duration of a communications session. It is expected that a repeater uplink ERP of between about −23 dBm and about +37 dBm (depending principally on the distance between the repeater 2 and the base station 4) will yield satisfactory performance for most installations.

In the downlink path, the IGC 30 controls the downlink channel RF signals received from the base station 4 with a substantially constant received power for transmission to the WCD 6 with a varying repeater downlink ERP. The power of downlink RF signals received from the base station 4, will normally be determined during set-up of the network wireless link 14, and thereafter will not change significantly, at least within the duration of a communications session. It is anticipated that downlink RF signals received from the base station 4 will normally have a power of between about −120 and −60 dBm, depending largely on the ERP of the base station 4 and the distance between the base station 4 and the repeater 2. The repeater downlink ERP will be continuously adjusted (by the IGC 30) to a minimum value consistent with satisfactory performance of the local link 22, and so implement adaptive coverage breathing (ACB), as will be described in greater detail below. It is anticipated that an repeater downlink ERP of up to about −20 dBm will yield satisfactory performance for most installations.

Referring to FIG. 2., the uplink path 36 comprises a wide-band uplink Automatic Gain Controller (AGC) 44 and a slaved variable gain amplifier (VGA) 46. The uplink AGC 44 interfaces with the down-converter 40 and the micro controller 42, as will be described in greater detail below. In preferred embodiments, the uplink path 36 is designed to receive, process and transmit RF signals across the entire uplink RF operating band. This processing bandwidth is only limited by the network system bandwidth. For example, North American 800 MHz cellular networks utilize an uplink frequency bandwidth of 25 MHz centered at 836.5 MHz.

Figure 3:
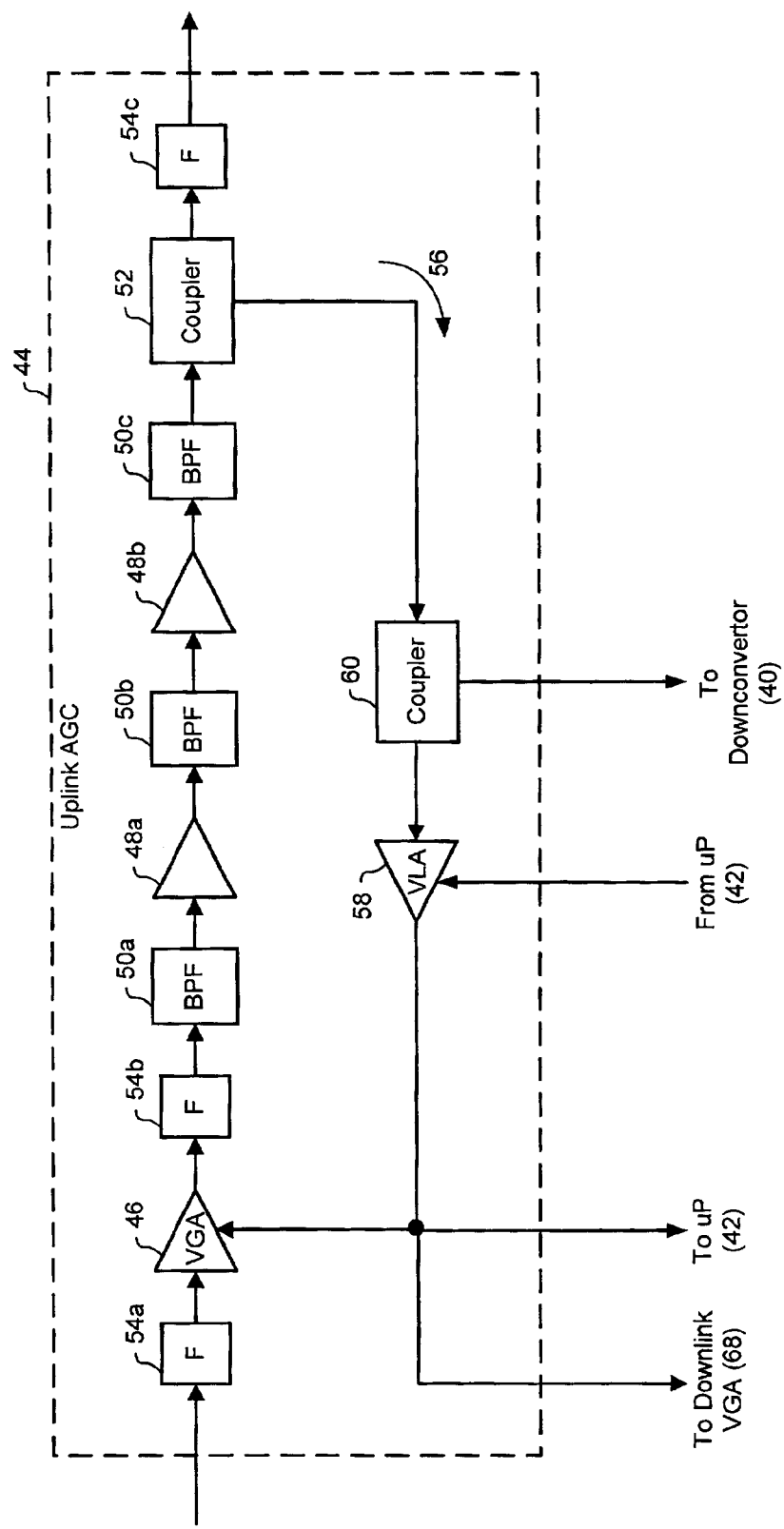
FIG. 3 is a block diagram schematically illustrating principle elements of an exemplary uplink AGC usable in the IGC of FIG. 2.

The uplink path 36 preferably provides substantially constant output leveling over a wide input range. Thus the ERP of uplink RF signals transmitted to the base station 4 will be substantially independent of variations in the signal power of uplink signals received from the WCD 6. In the embodiment of in FIG. 3, the uplink AGC 44 is provided as an extremely fast, wide dynamic range, highly linear block including a single VGA stage 46, fixed gain amplifiers 48a and 48b cascaded with band-pass filters 50, and a directional coupler 52. Inter-stage attenuators 54a–54c may also be included to optimize performance. The total gain of the uplink AGC 44 is controlled by the micro controller 42 in an inverse relationship to the received power of uplink RF signals. Thus the uplink AGC 44 gain is increased as the received uplink RF signal power decreases.

The VGA 46 preferably has approximately 60 dB of gain variation, and is cascaded with the fixed gain amplifiers 48 to enhance system linearity. The BPFs 50 following the VGA 46 limit the VGA noise to the uplink band, thereby preventing out-of-band signals from capturing the uplink AGC 44 and saturating the uplink output amplifier 62.

The directional coupler 52, which may be a 17 dB directional coupler, samples the uplink RF signal downstream of the VGA 46. The sample signal is supplied to a feedback path 56 comprising an RF Variable Log Amplifier (VLA) 58 and a feedback directional coupler 60 which samples the RF signal within the feedback path 56 and supplies the sample signal to the down-converter 40. The RF VLA 58 is a variable detection amplifier controlled by the micro controller 42. The output of the RF VLA 58 supplies a gain control signal to the uplink AGC VGA 46 and the downlink slaved VGA 68, and may also be supplied to the micro controller 42.

The feedback path 56 provides a 25 MHz bandwidth path which operates to ensure system stability by providing substantially instantaneous RF AGC feedback. The feedback path 56 closes the uplink AGC loop, which in turn limits system oscillation by automatically adjusting gain of the VGA 46 in the event of inadequate isolation between the DDA 16 and the SCA 24. The feedback path 56 also provides a means by which the gain of the uplink AGC 44 and the downlink slaved VGA 68 can be forced to a low level by the micro controller 42 to maintain stability during system setup, thereby ensuring the detection of weak desired signals in the downlink path 38 without the need for initial system isolation maximization and/or to disable the system in the event a major fault occurs.

The uplink slaved VGA 46 preferably has approximately 60 dB of gain variation, and accepts a gain control input from the downlink AGC 66 to provide the hardware means to adaptively minimize the uplink channel output power, and thereby mitigate potential interference to other base stations 4. It can be appreciated that in other embodiments of the preferred invention the slaved VGA 46 may be controlled directly by the micro controller 40 to accomplish the same task.

As shown in FIG. 2, the uplink path 36 may also include an output amplifier stage 62, along with one or more inter-stage filters 64a, 64b. The uplink output amplifier 62 provides a fixed gain to compensate for losses in the coaxial cable 12, while the inter-stage filters 64a, 64b limit cascaded noise.

The downlink path 38 comprises a wide-band downlink automatic gain controller (AGC) 66, and a slaved variable gain amplifier (VGA) 68. The downlink AGC 66 interfaces with the down-converter 40 and the micro controller 42, as will be described in greater detail below. In preferred embodiments, the downlink path 38 is designed to receive, process and transmit the entire downlink RF channel operating band. For example, North American 800 MHz cellular network has a downlink frequency bandwidth of 25 MHz centered at 881.5 MHz.

Figure 4:
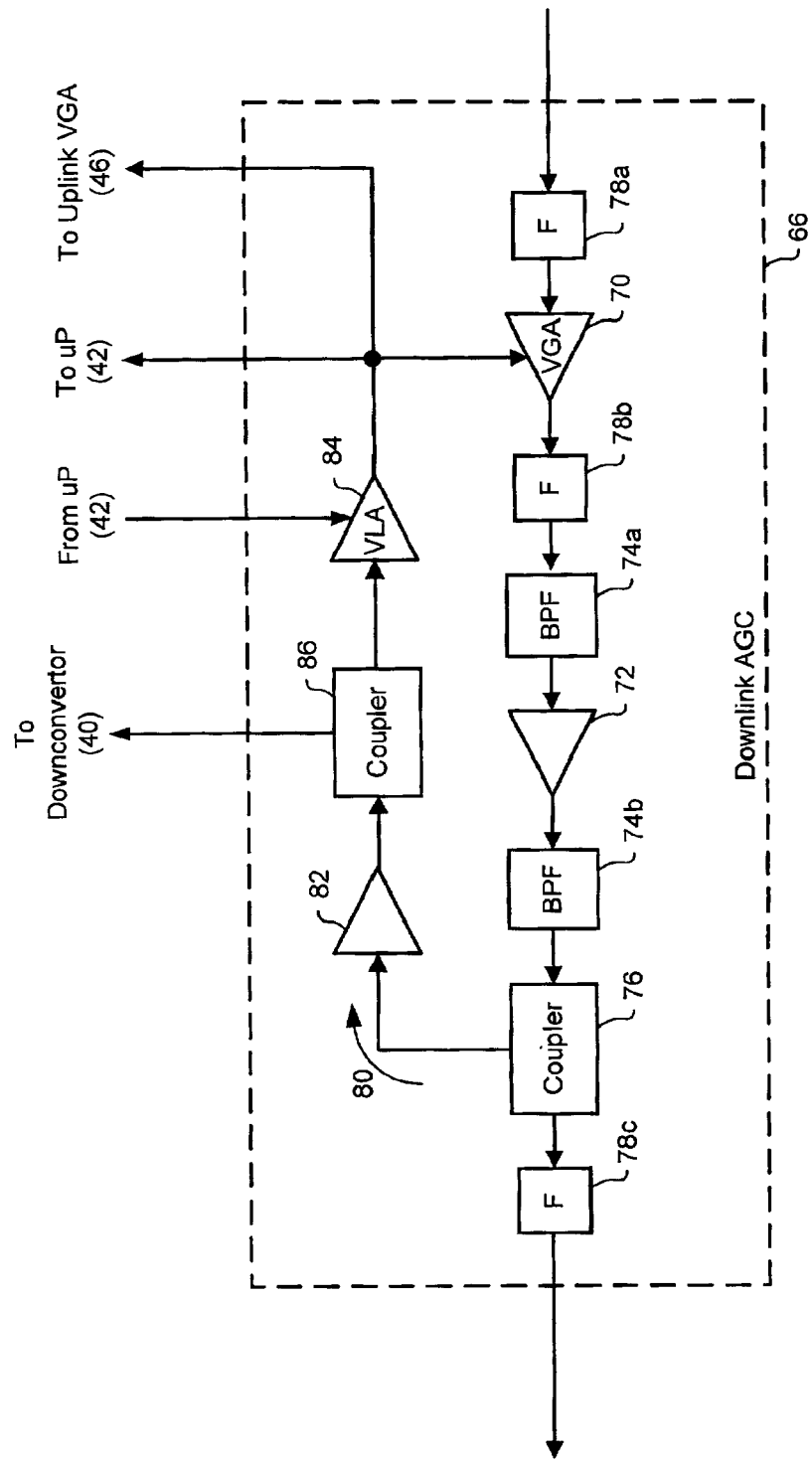
FIG. 4 is a block diagram schematically illustrating principle elements of an exemplary downlink AGC usable in the IGC of FIG. 2.

The downlink AGC 66 preferably provides substantially constant output leveling over a wide input range. As shown in FIG. 4, the downlink AGC 66 is preferably provided as an extremely fast, wide dynamic range, highly linear block comprising a single VGA stage 70, a fixed gain amplifier 72 cascaded with a pair of band-pass filters 74*a* and 74*b*, and a directional coupler 76. Inter-stage attenuators 78*a*–78*c* may also be included to optimize performance.

The downlink AGC VGA 70 preferably has approximately 60 dB of gain variation, and is cascaded with the fixed gain amplifier 72 to enhance system linearity while minimizing the cascaded noise figure. The BPFs 74*a* and 74*b* operate to limit VGA noise to the 25 MHz downlink bandwidth, thereby preventing out-of-band signals from capturing the downlink AGC 66 and saturating the downlink path output amplifier 90.

The directional coupler 76, which may be a 17 dB directional coupler, samples the downlink RF signal downstream of the VGA 70. The sample signal is supplied to a feedback path 80 which includes a cascaded RF amplifier 82 and log amplifier 84, and a feedback directional coupler 86 which samples the RF signal within the feedback path 80 and supplies the sample signal to the down-converter 40. The RF log amplifier 84 is preferably a variable detection log amplifier controlled by the micro controller 42. The output of the RF log amplifier 84 supplies a gain control signal to the downlink AGC VGA 70 and the uplink path slaved VGA 46, and may also be supplied to the micro controller 42. The feedback path 80 preferably provides a 25 MHz bandwidth path which operates to ensure system stability by providing substantially instantaneous RF AGC feedback. The feedback path 80 closes the AGC loop, which in turn limits system oscillation by automatically adjusting gain of the VGA 70 in the event of inadequate isolation between the DDA 16 and SCA 24. The feedback path 80 also provides a means by which the gain of the downlink AGC 66 can be forced to a low level by the micro controller 42 to disable the system in the event a major fault occurs.

The downlink slaved VGA 68 preferably has about 60 dB of gain variation, and accepts a gain control input from the uplink path AGC 44 to provide a hardware means to adaptively minimize the downlink output power. Thus, for example, the downlink slaved VGA 68 operates to reduce gain in the downlink path 38, as the received power of uplink RF signals increases, thereby reducing the coverage area of the subscriber's personal wireless space. It can be appreciated that in other embodiments of the preferred invention the slaved VGA 68 may be controlled directly by the micro controller 42 to accomplish the same task.

As shown in FIG. 2, the IGC downlink path 38 may also include a pre-amplifier 88, and an output amplifier stage 90. These elements can be cascaded with a band-pass filter (BPF) 92 and inter-stage attenuators 94*a* and 94*b* to reduce cascaded noise and optimize performance. The pre-amplifier 88 operates to preserve the S/N ratio established by the DDU 8, and buffers the port diplexer 34 from BPF 92. This BPF 92, together with the port diplexer 34, limits the downlink bandwidth to 25 MHz, rejecting both image and frequency crossover noise and any out-of-band signals, including RF signals in the uplink path 36. The output amplifier 90 provides a fixed gain to provide the necessary power output to the SCA 24.

Figure 5:
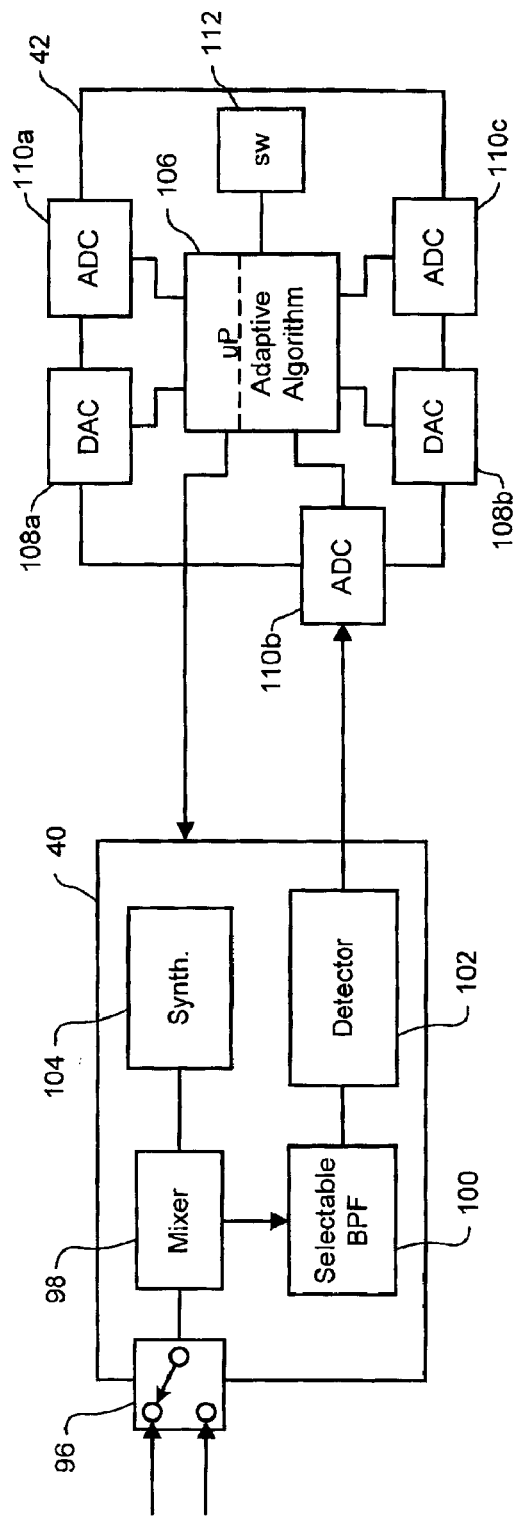
FIG. 5 is a block diagram schematically illustrating principal elements of exemplary down converter and micro controller modules usable in the IGC of FIG. 2.

As shown in FIG. 5, the down-converter 40 comprises a switching input 96, an active mixer 98, a selectable band pass filter 100, a log amp detector 102, and a synthesizer 104 which can be selectively tuned by the micro controller 42. The switching input 96 is controlled by the micro controller 42 to supply an RF signal from a selected one of the uplink and downlink AGCs 44 and 66 to the active mixer 98. Similarly, the synthesizer 104 is controlled by the micro controller 42 to supply an RF synthesized signal to the mixer 98. The RF sample signal and the synthesizer signal are processed by the mixer 98, in a conventional manner, to generate an intermediate frequency (IF) signal. This IF signal is used by the selectable BPF 100 to channel the RF sample signal by selectively attenuating portions of the RF sample signal lying outside a narrow pass-band (of, for example, about 30 KHz bandwidth) centered on the IF. The output of the selectable BPF 100 is supplied to the detection log amplifier 102, which operates to detect the presence (and power level) of desired RF signals in each of the uplink and downlink channels (depending on the state of the switching input 96). The output of the detection log amplifier 102 is supplied to the micro controller 42, and is used for decision making in accordance with the adaptive control algorithm (ACA).

Thus, when the switching input 96 supplies an RF signal from the uplink AGC 44 to the mixer 98, the selectable BPF 100 and detection log amplifier 102 operate to detect the power level and number of desired RF signals within the uplink channel 36, and this information can be used by the micro controller 42 to determine the signal format, set the appropriate power (i.e., gain) in the uplink path 36 and, for each detected desired RF signal, tune the synthesizer 104 to the corresponding downlink channel frequency (e.g., 45 MHz above the frequency of the detected signal), if necessary.

Similarly, when the switching input 96 supplies an RF signal from the downlink AGC 66 to the mixer 98, the selectable BPF 100 and detection log amplifier 102 operate to detect weak desired signals within the downlink channel 38, and this information can be used by the micro controller 42 to determine the downlink signal format, set the appropriate power (i.e., gain) in the downlink path 38 and, for each detected desired RF signal, tune the synthesizer 104 to the corresponding uplink channel frequency (e.g., 45 MHz below the frequency of the detected RF signal), if necessary.

The design of the down-converter 40 enables the micro controller 42 to detect any number of weak desired uplink and downlink RF signals that are below either high-level wanted signals and/or adjacent carrier signals, or the system noise floor within a respective 25 MHz bandwidth. The micro controller 42 can provide a digital correction to each of the AGCs 44 and 66, thereby offsetting the respective leveled outputs to the weak desired signals. This arrangement enables the IGC 30 (and thus the repeater 2) to mediate signal traffic between the base station 4 and any number of WCDs 6 within the wireless space of the repeater 2.

The micro controller 42 comprises a micro-processor 106 operating under the control of suitable software that implements an Adaptive Control Algorithm (ACA), one or more Digital-to-Analog converters (DACs) 108 and Analog-to-Digital Converters (ADCs) 110 which operate, in a manner well known in the art, to provide translation between digital and analog signal formats, and thereby enable interaction between the micro controller 42 and other elements of the IGC 30. As will be described in greater detail below, the adaptive control algorithm provides the necessary processing control for IGC operation without intervention after installation. It may also control operation during system set-up, in order to simplify installation of the repeater 2.

As shown in FIG. 5, the micro controller 42 may also include a configuration switch 112 to enable the subscriber to control an operating configuration (or mode) of the micro controller 42. The configuration switch 112, which may be provided as a conventional DIP switch, may have one or more settings allowing the subscriber to select an operating configuration (or mode) of the micro controller 42. Exemplary settings of the configuration switch may include:

- a "set-up" setting which may be used during installation of the repeater 2. For example, the micro controller 42 may reduce AGC gain (and thus transmission power levels) to enable the subscriber to adjust the placement and positioning of the DDU 8 and SCU 10;
- a "run" setting which may be used during normal operation of the repeater 2;
- a carrier A/B band select setting which may be used by the subscriber to select a desired carrier. Carrier A/B bands may be selected together or individually; and
- one or more settings by which the subscriber can choose to define maximum and/or minimum coverage areas of the subscriber's personal wireless space, e.g., by causing the micro controller 42 to limit gain of the downlink AGC 66.

As mentioned previously, the micro-processor 106 operates under the control of suitable software that implements the Adaptive Control Algorithm (ACA). In general, the ACA provides knowledge-based control over the functionality of the IGC 30, thereby providing dramatically greater versatility than is possible with conventional (analog math-based) RF signal processing techniques. In general, the ACA enables the following functionality of the IGC 30:

- selective tuning and controlling of desired RF signals;
- adaptive mitigation of interference in the subscriber's personal wireless space; and
- unconditional system stability (thus prevention of system oscillation) with imperfect isolation between the DDA 16 and SCA 24.

Each of these areas of functionality are described in greater detail below.

Selective Tuning

As described above, the uplink and downlink paths 36 and 38 are wide bandwidth RF signal paths capable of controlling RF signals across the entire 25 MHz bandwidth of the uplink and downlink channels. In contrast, the down-converter 40 is designed to detect individual desired RF signals within the wide bandwidth paths 36 and 38. In particular, the down-converter 40 operates to detect the presence (and power level) of an RF signal within a narrow pass-band (of, for example, about 30 KHz bandwidth) centered on the IF frequency generated by the mixing of the synthesizer signal and the RF signal. By tuning the synthesizer 104 to various frequencies in succession, the micro controller 42 can scan the entire 25 MHz bandwidth of each channel to detect weak desired RF signals. The speed at which the micro-controller 42 can scan an entire channel (e.g. 25 MHz band-width) will vary with the bandwidth of the selectable BPF 100. A larger bandwidth of the selectable BPF 100 increases the scanning speed, and thus allows the micro-controller 42 to isolate the discrete RF signals faster. In most cases, this increased processing speed is obtained at a cost of reduced sensitivity to weak signals. However, by dynamically switching the selectable filter 100 from a wide to narrow bandwidth and thereby restricting the detection to a narrowband centered on the intermediate frequency (e.g. by reducing the bandwidth of the selectable BPF 100), the down-converter 40 and micro controller 42 can detect weak desired RF signals that are embedded in noise.

More particularly, the down-converter 40 and micro controller 42 cooperate to implement a digital offset correction technique in which the gain of a wide-band AGC is set for RF signals that may not have captured the AGCs. As is known in the art, a wide-band AGC will normally level to the highest signal that captures the AGC within a defined bandwidth. If no signals are present, the AGC may level to the thermal and system noise of a given bandwidth. If weak desired (i.e., uplink or downlink RF) signals are present, and the AGC bandwidth is much larger than the signal bandwidth (such that noise masks the weak signals) a conventional AGC will tend to be captured by the noise rather than the weak desired signal. In the present invention, the narrow-band detection capability of the down-converter 40 is used to detect the (weak) desired signals embedded in the noise. Detection of the desired uplink and downlink signals is then used by the micro controller 42 to offset the output to which the respective AGCs 44 and 66 level. This same technique can also be used to detect weak and moderate desired signals in the presence of high-level unwanted signals that would otherwise capture an AGC and limit the system gain for the desired signals.

In addition, the ACA can implement a variety of signal evaluation techniques, as desired. For example, by controlling the bandwidth of the selectable BPF 100 and monitoring the detection signal output by the detector 102, the micro controller 42 can detect changes in the RF signals in each of the paths 36 and 38. These changes can be used to identify the format of the RF signals being used by the subscriber's WCD 6. In particular, periodic pulse-like changes in the signal level in the uplink path 37 (independent of selectable BPF 100 bandwidth) indicates that the WCD 6 is using a narrow-band pulsed (e.g., Time Division Multiple Access (TDMA)) signal format. Changes in power level due to changes in the bandwidth of the selectable BPF 100 indicates that the WCD 6 is using a broad-band (e.g., Code Division Multiple Access (CDMA)) signal format. If neither of these types of changes are detected, then the WCD 6 is using a narrowband continuous (e.g., Advanced Mobile Phone Service (AMPS)) signal format. Once the signal format is known, the ACA can select appropriate parameters for optimizing the gain of uplink and downlink paths 36 and 38.

Adaptive Mitigation of Interference

As is known in the art, as the number of subscribers and WCDs increases, the problem of interference becomes progressively more acute. The type and degree of interference varies from one network to the other, and may vary from area-to-area within a network. So-called "Smart" antenna technology has been used in a wide variety of applications to combat interference. This smart antenna technology can be effectively applied at the base station 4 to reduce the interference problem for both the downlink (interference to the WCD 6 from other base stations) and the uplink (interference to the base station 4 from other WCDs) communication paths. However, smart antenna technology has generally not been used to mitigate interference occurring at the WCD end of the link. This is largely due to the size and power constraints of the WCD, and the requirement that the WCD's antenna must be omni-directional to successfully connect to, and communicate with, the base station 4.

In accordance with the present invention, the repeater 2 implements a technique of Adaptive Interference Mitigation, in which RF interference in the subscriber's personal wireless space is mitigated by a combination of one or more of: physical antenna separation; the use of a narrow beam network link 14 between the repeater 2 and the base station 4; and Adaptive Coverage Breathing (ACB). Physical separation of the DDA 16 and SCA 24 reduces the possibility that that the WCD 6 will receive uplink RF signals transmitted by the DDA 16 toward the base station 4, and hence all but eliminates the possibility of the WCD receiver being overwhelmed by the DDA's ERP. Further isolation between the DDA 16 and the WCD 6 is achieved by the use of a directional antenna for the DDA 16, which results in a comparatively narrow beam propagation path of the network link 14. As will be appreciated, the probability that the WCD 6 will pass into the narrow propagation path of the network link 14 can be reduced (to near zero) by suitable placement of the DDA 16.

Similarly, interference within the subscriber's wireless space due to signals propagating from other base stations is dramatically reduced, because the DDA 16 will tend to only receive signals transmitted by base stations lying within the narrow propagation path of the network link 14. As a result, signals emitted by base stations lying outside the network link 14 will not be amplified by the DDA 16 and transmitted into the subscriber's personal wireless space by the repeater 2. Unlike conventional mitigation schemes, where the interference is reduced relative to the desired signal (or itself), the repeater 2 operates to selectively detect and amplify the desired signal(s) relative to the interference.

With this discrimination in hand, the IGC 30 amplifies and conditions the desired RF signals for transmission into the subscriber's personal wireless space such that the WCD 6 receives a substantially constant downlink signal power, independent of its location relative to the repeater 2. Thus the ACA implements a technique of Adaptive Coverage Breathing (ACB), such that the coverage area of the subscriber's personal wireless space is automatically adjusted in order to ensure: acceptable signal-to-noise ratio in both the uplink and downlink paths of the local link 22; the received downlink signal power is maintained substantially constant at the WCD 6; and transmission (i.e., uplink RF signal) power from the WCD 6 is minimized.

In general, Adaptive Coverage Breathing (ACB) comprises a technique of RF power management that enables the coverage area of the subscriber's personal wireless space to "breathe"; adaptively expanding and contracting to the position of the subscriber's WCD 6 relative to the SCA 24. This allows both the WCD 6 and the SCA 24 to radiate only the necessary powers needed to maintain reliable signaling over the local link 22. As the WCD 6 moves relative to the SCA 24, the coverage area of the personal wireless space changes continuously to adapt to the movement. As the WCD 6 moves towards the SCA 24, the IGC 30 causes the coverage area to contract, so that the personal wireless space is limited to just encompass the WCD 6. This can be accomplished by monitoring the signal power of uplink RF signals received from the WCD 6, and then adjusting the gain of the downlink VGA 68 to control the transmission power (i.e., the ERP) of downlink RF signals accordingly. If two or more WCDs are being used simultaneously, then the IGC 30 can expand the coverage area to accommodate the WCD located furthest from the SCA 26 (or transmitting the weakest uplink RF signals). This can be achieved by measuring the power of uplink RF signals received from each of the wireless communications devices, and adjusting the downlink transmit power based on the measured signal power level of the weakest RF signal.

In operation, a minimum acceptable uplink channel RF signal power of the WCD 6 can be negotiated with the base station at a start of a communications session. This uplink channel RF signal power is then maintained substantially constant by the WCD 6 (during the communications session). The IGC 30 adapts to changes in the position of the WCD 6 by accepting widely varying uplink channel RF signal powers from the WCD 6 and controlling the downlink channel ERP to hold the downlink RF signal power received by the WCD 6 substantially constant. With this arrangement, the variation in received uplink channel RF signal power may be as high as 50 to 60 dB, depending largely on the proximity of the WCD 6 to the SCA 24.

As described above, the received uplink channel RF signal power level can be measured by the down-converter 40, and used by the micro controller 42 to control the downlink channel RF ERP. For example, if the received power of the uplink RF signals is greater than a predetermined minimum threshold, then the downlink RF signal transmit power can be reduced (i.e., the coverage area of the subscriber's personal wireless space reduced) to improve spectrum efficiency, conserve energy, increase reliability and reduce system gain. Conversely, if the measured power of the received uplink RF signals drops below the predetermined minimum threshold, then the downlink RF signal ERP can be increased (i.e., the coverage area of the subscriber's personal wireless space 6 expanded) to improve the signal-to-noise ratio. If desired, the ACA may select the value of the threshold, from among a set of predetermined threshold values. This selection may, for example, be based on a determination of the signal format as described above.

Unconditional System Stability

As is known in the art, on-frequency repeaters can oscillate if the system gain exceeds the total system isolation (e.g., the front to back ratios of the DDA 16 and SCA 24; polarization loss; and propagation path loss). For this reason, and depending on the required link performance, installation of on-frequency repeaters can be very difficult. In accordance with the present invention, the IGC 30 implements Adaptive Coverage Breathing (ACB) and Coverage Area Signature (CAS) to prevent oscillations occurring due to system instability during installation and subsequent operation of the repeater 2.

As discussed above, Adaptive Coverage Breathing (ACB) ensures that minimum power is transmitted in both the uplink and downlink paths to maintain reliable network and local links 14 and 22. Thus the system gain is only as high as it needs to be in both paths 36 and 38, resulting in greater system stability than would be the case if the system gain was fixed at a level high enough to provide satisfactory performance under most operating conditions.

One difficulty in ensuring system stability is that leakage signals (i.e., signals propagating between the DDA 16 and SCA 24) are correlated with desired signals received from the base station 4 and WCD 6. In particular, since downlink RF signals are transmitted by both the base station 4 and the SCA 24 at the same frequency, imperfect isolation between the SCA 24 and the DDA 16 will result in the DDA 16 receiving signals from both the base station 4 and the SCA 24. Since these signals will be closely correlated (in time) it is difficult to determine what portion of the total signal received at the DDA 16 is the desired downlink RF signal from the base station 4, and what portion is the undesired leakage signal from the SCA 24. Similarly, imperfect isolation between the SCA 24 and the DDA 16 will result in the SCA 24 receiving uplink RF signals from both the WCD 6 and the DDA 16. Since these signals will be closely correlated, it is difficult to determine what portion of the total signal received at the SCA 24 is the desired uplink RF signal from the WCD 6, and what portion is the undesired leakage signal from the DDA 16.

In accordance with the present invention, the ACA implements a Coverage Area Signature (CAS) technique to de-correlate leakage signals from the desired received signals. This de-correlation allows the micro controller 42 to distinguish leakage signals from the desired signals, and adaptively adjust the gain to maintain a predetermined level of stability.

In general, the CAS technique involves transmitting a unique code (or signature) as a signal having a predetermined power, and then monitoring received signals to detect the transmitted code. Comparison of the signal power of the detected code to the known transmit power provides an indication of the power level of leakage signals, and thus the total system isolation. Based on this information, the micro controller 42 can control the gain in each of the paths 36 and 38 to limit the leakage signal power to a predetermined acceptable level.

The unique code may be provided as any signal pattern that can be reliably detected within the uplink and downlink RF signal traffic. Preferably, the unique code is transmitted as a form of RF modulation (either in amplitude and/or phase changes that instantaneously affect the entire system operating RF bandwidth), as this provides for a more accurate estimate of the degree of signal leakage at any frequency of interest. In this case, however, it is important that the unique code be selected such that it can be inserted into the uplink and downlink paths 36 and 38 without disrupting the RF signal traffic or disturbing the performance of the base station 4 and WCD 6. Thus in preferred embodiments, the unique code is provided as a low level dither (or fade) imposed on the entire RF signal traffic within each path 36 and 38.

For example, the micro controller 42 can control the downlink slaved VGA 68 to dither the downlink path gain, and thereby effect an "amplitude modulation" of downlink RF signals transmitted by the SCA 24. The dither pattern (in time) defines the unique code, and may take the form of a periodic change in signal power or may encode data such as, for example, a predetermined sequence of bits. In either case, the modulation power can be kept low enough to avoid disrupting the WCD 6, and the variations in signal power will have no effect on the frequency modulated content of the downlink RF signals.

Simultaneously, the micro controller 42 can monitor the detection signal generated by the downlink AGC 66 to detect changes in the received power of downlink RF signals received through the DDA 16. These detected changes can be correlated (in time) with the downlink path gain dither to detect the unique code within the received downlink RF signals. The micro controller 42 can then compare the modulation power of the detected unique code (within the received downlink RF signals) to the downlink path gain dither introduced by the downlink slaved VGA 68, to obtain an indication of the signal leakage between the SCA 24 and the DDA 16.

Similarly, the micro controller 42 can control the uplink slaved VGA 46 to dither the uplink path gain, and thereby impose an "amplitude modulation" onto the uplink RF signals. Here again, the modulation power can be kept low enough to avoid disrupting the base station 4, and the variations in signal power will have no effect on the frequency modulated content of the uplink RF signals. Simultaneously, the micro controller 42 can monitor the detection signal generated by the uplink AGC 44 to detect changes in the received power of uplink RF signals received through the SCA 24. These detected changes can be correlated (in time) with the uplink path gain dither to detect the unique code within the received uplink RF signals. The micro controller 42 can then compare the modulation power of the detected unique code (within the received uplink RF signals) to the uplink path gain dither introduced by the uplink slaved VGA 46, to obtain an indication of the signal leakage between the DDA 16 and the SCA 24.

Once the signal leakage between the DDA 16 and the SCA 24 (for both the uplink and downlink paths 36 and 38) is known, the micro controller 42 can control the uplink and downlink AGCs 44 and 66 and/or the slaved VGAs 46 and 68 as required to maintain the signal leakage at an acceptable level. For example, if the signal leakage in either path 36 and 38 is found to be above a predetermined threshold level, the micro controller 42 can control the respective uplink or downlink AGC 44 and 66 to reduce the path gain. This reduction will have the effect of reducing the coverage area of the subscriber's personal wireless space, but will not otherwise disrupt the performance of either of the network or local wireless links 14 and 22.

The predetermined threshold level of acceptable signal leakage can be suitably selected to provide a balance between system stability (i.e., resistance to oscillation) and performance of the network and local wireless links 14 and 22. When taken in combination with other sources of isolation between the SCA 24 and the DDA 16 (e.g., front to back ratios of the DDA 16 and SCA 24; polarization loss and propagation losses), it is possible to set a threshold level which ensures unconditional system stability while preserving sufficient range of gain variation in the uplink and downlink paths 36 and 38 to deliver satisfactory performance of the network and local wireless links 14 and 22. Prior art repeaters typically require 10–15 dB of isolation/gain margin. Because the CAS concept is adaptive, 6 dB of isolation/gain margin is possible to maintain an unconditional stable system with wide variations in gain and isolation changes. This gain improvement of 4 to 9 dB will in effect double the coverage area and all the repeater to be installed at a distance two times further from the base station.

Thus it will be seen that the present invention provides an Intelligent gain controller capable of controlling the gain in each of the wideband uplink and downlink signal paths. Weak desired signals are detected using a narrowband down converter and detector, and these desired signals are monitored by the micro controller. The micro controller operates, under control of suitable software implementing an Adaptive Control Algorithm, to adjust the gain in each of the uplink and downlink paths.

The embodiment(s) of the invention described above is(are) intended to be exemplary only. The scope of the invention is therefore intended to be limited solely by the scope of the appended claims.

I claim:

1. A gain controller for controlling a gain of a repeater adapted to mediate RF signal traffic between first and second transceivers of a wireless communications network, the gain controller comprising:
   a wideband signal path adapted to process RF signals within a respective channel of the communications network;
   a narrowband detector connected to the wideband signal path; and a digital controller adapted to control: the narrowband detector to detect a respective power level of a desired RF signal within the wideband signal path; and a gain of the wideband signal path based on the detected power level of the desired RF signal;

wherein the wideband signal path comprises:

a first gain control block adapted to selectively control a first gain of the wideband signal path, the first gain being selected to compensate attenuation of the RF signal traffic received by the repeater from the first transceiver; and a second gain control block adapted to selectively control a second gain of the wideband signal path, the second gain being selected to compensate attenuation of the RF signal traffic transmitted by the repeater to the second transceiver.

2. A gain controller as claimed in claim 1, wherein respective first and second wideband signal paths are adapted to simultaneously process RF signals within respective uplink and downlink channels of the communications network.

3. A gain controller as claimed in claim 2, wherein the narrowband detector and the digital controller are shared by the first and second wideband signal paths.

4. A gain controller as claimed in claim 2, wherein each wideband signal path has a bandwidth corresponding to a respective one of an uplink channel bandwidth and a downlink channel bandwidth of the wireless communications network.

5. A gain controller as claimed in claim 4, wherein the bandwidth of each channel is about 25 MHz.

6. A gain controller as claimed in claim 1, wherein the first gain control block is an Automatic Gain Control (AGC) block adapted to control the first signal gain based on a power of the RF signal traffic received from the first transceiver.

7. A gain controller as claimed in claim 6, wherein the AGC block comprises:

a path Variable Gain Amplifier (VGA) adapted to control gain of the wideband signal path in response to a gain control signal;

an AGC feed-back loop adapted to supply a feedback signal to the path VGA as the gain control signal; and a feed-back loop amplifier adapted to control a power level of the feedback signal supplied to the VGA, in response to an AGC control signal from the controller.

8. A gain controller as claimed in claim 7, wherein the feed-back loop amplifier comprises a variable amplifier operatively coupled to receive the AGC control signal from the controller.

9. A gain controller as claimed in claim 8, wherein the variable amplifier is a variable logarithmic amplifier.

10. A gain controller as claimed in claim 7, wherein the AGC feed-back loop further comprises a coupler adapted to supply a sample of RF signals in the wideband signal path to the narrowband detector.

11. A gain controller as claimed in claim 1, wherein the second gain control block comprises a slaved variable gain amplifier adapted to selectively control the second signal gain based on a power of RF signals received from the second transceiver.

12. A gain controller as claimed in claim 11, wherein the slaved variable gain amplifier is adapted to automatically reduce the second signal gain as the power of RF signals received from the second transceiver increases, and increase the second signal gain as the power of RF signals received from the second transceiver decreases.

13. A gain controller as claimed in claim 1, wherein the narrowband detector comprises:

a synthesizer adapted to generate a synthesizer signal having a selected frequency;

an input adapted to receive a sample signal from the wideband signal path;

a mixer adapted to generate an intermediate frequency based on the synthesizer signal and the RF sample signal;

a signal isolator adapted to isolate, from the RF sample signal, RF signals lying within a narrow pass-band centered on the intermediate frequency; and a detector unit adapted to detect at least a power level of the isolated RF signals.

14. A gain controller as claimed in claim 13, wherein the synthesizer is adapted to select a frequency of the synthesizer signal using a synthesizer control signal from the micro controller.

15. A gain controller as claimed in claim 13, wherein the input comprises a switching input adapted to selectively supply RF signals from one of the first and a second wideband signal paths to the mixer.

16. A gain controller as claimed in claim 13, wherein the signal isolator comprises a selectable filter adapted to selectively attenuate a portion of the RF sample signal lying outside the narrow pass-band.

17. A gain controller as claimed in claim 16, wherein the narrow pass-band has a bandwidth of approximately 30 kHz.

18. A gain controller as claimed in claim 16, wherein the selectable filter is adapted to adjust a bandwidth of the narrow pass-band in response to a control signal from the micro controller.

19. A gain controller as claimed in claim 1, wherein the controller comprises:

a micro-processor operatively coupled to each of the first and second gain control blocks and the narrowband detector; and software defining an Adaptive Control Algorithm for controlling operation of the micro-processor.

20. A gain controller as claimed in claim 19, wherein the software comprises software code adapted to:

monitor a power level of RF signals detected by the narrowband detector;

compare the monitored power level to at least one threshold value; and determine an optimum value of at least the first gain of the wideband signal path using the comparison result.

21. A gain controller as claimed in claim 20, wherein the software code adapted to monitor the power level of RF signals, further comprises software code adapted to:

monitor changes in the power level of the RF signals detected by the narrowband detector; and identify a signal format of the detected RF signals, using the monitored changes.

22. A gain controller as claimed in claim 20, further comprising software code adapted to select the threshold value from among a set of predetermined threshold values, using the identified signal format.

23. A gain controller as claimed in claim 20, wherein the software code adapted to monitor the power level of RF signals further comprises software code adapted to decorrelate desired RF signal traffic from undesired leakage signals within the wideband signal path.

24. A gain controller as claimed in claim 23, wherein the software code adapted to decorrelate desired RF signal traffic from undesired leakage signals comprises software code adapted to:
  inject a predetermined unique code into the wideband signal path;
  detect a power level of the predetermined unique code in the monitored RF signal; and
  determine a proportion of leakage signals in the monitored RF signal using on the detected power level of the predetermined unique code in the monitored RF signal.

25. A gain controller as claimed in claim 24, further comprising software code adapted to adjust the optimum value of at least the first gain of the wideband signal path using the determined proportion of leakage signals in the monitored RF signals.

26. A repeater adapted to mediate RF signaling between first and second transceivers of a wireless communications network, the repeater comprising:
  a wideband signal path adapted to process RF signals within a respective channel of the communications network;
  a narrowband detector connected to the wideband signal path; and
  a digital controller adapted to control: the narrowband detector to detect a respective power level of a desired RF signal within the wideband signal path; and a gain of the wideband signal path based on the detected power level of the desired RF signal;
  wherein the wideband signal path comprises:
    a first gain control block adapted to selectively control a first gain of the wideband signal path, the first gain being selected to compensate attenuation of the RF signal traffic received by the repeater from the first transceiver; and
    a second gain control block adapted to selectively control a second gain of the wideband signal path, the second gain being selected to compensate attenuation of the RF signal traffic transmitted by the repeater to the second transceiver.

27. A repeater as claimed in claim 26, wherein respective first and second wideband signal paths are adapted to simultaneously process RF signals within respective uplink and downlink channels of the communications network.

28. A repeater as claimed in claim 27, wherein the narrowband detector and the digital controller are shared by the first and second wideband signal paths.

29. A repeater as claimed in claim 27, wherein each wideband signal path has a bandwidth corresponding to a respective one of an uplink channel bandwidth and a downlink channel bandwidth of the wireless communications network.

30. A repeater as claimed in claim 29, wherein the bandwidth of each channel is about 25 MHz.

31. A repeater as claimed in claim 26, wherein the first gain control block is an Automatic Gain Control (AGC) block adapted to control the first signal gain based on a power of the signals received from the first transceiver.

32. A repeater as claimed in claim 31, wherein the AGC block comprises:
  a Variable Gain Amplifier (VGA) adapted to control gain of the wideband signal path in response to a gain control signal;
  an AGC feed-back loop adapted to supply a feedback signal to the VGA as the gain control signal; and
  a feed-back loop amplifier adapted to control a power level of the feedback signal supplied to the VGA, in response to an AGC control signal from the controller.

33. A repeater as claimed in claim 32, wherein the feed-back loop amplifier comprises a variable amplifier operatively coupled to receive the AGC control signal from the controller.

34. A repeater as claimed in claim 33, wherein the variable amplifier is a variable logarithmic amplifier.

35. A repeater as claimed in claim 32, wherein the AGC feed-back loop further comprises a coupler adapted to supply a sample of RF signals in the wideband signal path to the narrowband detector.

36. A repeater as claimed in claim 26, wherein the second gain control block comprises a slaved variable gain amplifier adapted to selectively control the second signal gain based on a power of RF signals received from the second transceiver.

37. A repeater as claimed in claim 36, wherein the slaved variable gain amplifier is adapted to automatically reduce the second signal gain as the power of RF signals received from the second transceiver increases, and increase the second signal gain as the power of RF signals received from the second transceiver decreases.

38. A repeater as claimed in claim 26, wherein the narrowband detector comprises:
  a synthesizer adapted to generate a synthesizer signal having a selected frequency;
  an input adapted to receive a sample signal from the wideband signal path;
  a mixer adapted to generate an intermediate frequency based on the synthesizer signal and the sample signal;
  a signal isolator adapted to isolate, from the RF sample signal, signals lying within a narrow pass-band centered on the intermediate frequency; and
  a detector unit adapted to detect at least a power level of the isolated RF signals.

39. A repeater as claimed in claim 38, wherein the synthesizer is adapted to select a frequency of the synthesizer signal using a synthesizer control signal from the controller.

40. A repeater as claimed in claim 38, wherein the input comprises a switching input adapted to selectively supply signals from one of the first and a second wideband signal paths to the mixer.

41. A repeater as claimed in claim 38, wherein the signal isolator comprises a selectable filter adapted to selectively attenuate a portion of the sample signal lying outside the narrow pass-band.

42. A repeater as claimed in claim 41, wherein the narrow pass-band has a bandwidth of approximately 30 kHz.

43. A repeater as claimed in claim 41, wherein the selectable filter is adapted to adjust a bandwidth of the narrow pass-band in response to a control signal from the controller.

44. A repeater as claimed in claim 26, wherein the controller comprises:
  a micro-processor operatively coupled to each of the first and second gain control blocks and the narrowband detector; and
  software defining an Adaptive Control Algorithm for controlling operation of the micro-processor.

45. A repeater as claimed in claim 44, wherein the software comprises software code adapted to:
  monitor a power level of RF signals detected by the narrowband detector;
  compare the monitored power level to at least one threshold value; and
  determine an optimum value of at least the first gain of the wideband signal path using the comparison result.

46. A repeater as claimed in claim 45, wherein the software code adapted to monitor the power level of signals further comprises software code adapted to:
- monitor changes in the power level of the signals detected by the narrowband detector; and
- identify a signal format of the detected RF signals, using the monitored changes.

47. A repeater as claimed in claim 45, further comprising software code adapted to select the threshold value from among a set of predetermined threshold values, using the identified signal format.

48. A repeater as claimed in claim 45, wherein the software code adapted to monitor the power level of signals further comprises software code adapted to decorrelate desired RF signal traffic from undesired leakage signals within the wideband signal path.

49. A repeater as claimed in claim 48, wherein the software code adapted to decorrelate desired RF signal traffic from undesired leakage signals comprises software code adapted to:
- inject a predetermined unique code into the wideband signal path;
- detect a power level of the predetermined unique code in the monitored signal; and
- determine a proportion of leakage signals in the monitored signal using on the detected power level of the predetermined unique code in the monitored signals.

50. A repeater as claimed in claim 49, further comprising software code adapted to adjust the optimum value of at least the first gain of the wideband signal path using the determined proportion of leakage signals in the monitored RF signals.

51. A method of controlling gain of a repeater adapted to mediate RF signal traffic between first and second transceivers of a wireless communications network, the method comprising steps of:
- receiving RF signals of a channel of the communications network via a respective wideband signal path of the repeater;
- digitally controlling a narrow band detector to detect a respective power level of a desired RF signal within the wideband signal path; and
- digitally controlling a gain of the wideband signal path based on the detected power level of the desired RF signal;
- wherein the step of controlling gain of the wideband signal path comprises steps of:
  - selectively controlling a first gain of the wideband signal path, the first gain being selected to compensate attenuation of the RF signal traffic received by the repeater from the first transceiver; and
  - selectively controlling a second gain of the wideband signal path, the second gain being selected to compensate attenuation of the RF signal traffic transmitted by the repeater to the second transceiver.

52. A method as claimed in claim 51, wherein the step of selectively controlling a first gain of the wideband signal path comprises steps of:
- sampling signals in the wideband signal path to generate a feedback signal;
- controlling a power level of the feedback signal in response to an AGC control signal to generate a gain control signal; and
- controlling gain of the wideband signal path in response to the gain control signal.

53. A method as claimed in claim 52, wherein the AGC control signal is generated by a controller.

54. A method as claimed in claim 52, wherein the step of controlling a power level of the feedback signal in response to an AGC control signal comprises steps of:
- monitoring the detected power level of the signals within the wideband signal path;
- comparing the monitored power level to at least one threshold value;
- determine an optimum value of at least the first gain of the wideband signal path using the comparison result; and
- generating the AGC control signal based on the determined optimum first gain.

55. A method as claimed in claim 54, wherein the step of monitoring the power level of the RF signals within the wideband signal path further comprises steps of:
- monitoring changes in the power level of the signals; and
- identifying a signal format of the detected signals using the monitored changes.

56. A method as claimed in claim 55, further comprising a step of selecting the threshold value from among a set of predetermined threshold values, using the identified signal format.

57. A method as claimed in claim 54, wherein the step of monitoring the power level of the RF signals within the wideband signal path further comprises a step of decorrelating desired signal traffic from undesired leakage signals within the wideband signal path.

58. A method as claimed in claim 57, wherein the step of decorrelating desired signal traffic from undesired leakage signals comprises steps of:
- injecting a predetermined unique code into the wideband signal path;
- detecting a power level of the predetermined unique code in the monitored signal; and
- determining a proportion of leakage signals in the monitored signal using on the detected power level of the predetermined unique code in the monitored signal.

59. A method as claimed in claim 58, further comprising a step of adjusting the optimum value of at least the first gain of the wideband signal path using the determined proportion of leakage signals in the monitored signals.

60. A method as claimed in claim 51, wherein the step of selectively controlling a second gain of the wideband signal path comprises steps of:
- automatically reducing the second signal gain as the power of RF signals received from the second transceiver increases; and
- automatically increasing the second signal gain as the power of RF signals received from the second transceiver decreases.

61. A method as claimed in claim 51, wherein the step of detecting a power level of the signals within the wideband signal path comprises steps of:
- generating a synthesizer signal having a selected frequency;
- receiving a sample signal from the wideband signal path;
- generating an intermediate frequency based on the synthesizer signal and the sample signal;
- isolating, from the sample signal, signals lying within a narrow pass-band centered on the intermediate frequency; and
- detecting at least a power level of the isolated signals.

62. A method as claimed in claim 61, wherein the synthesizer signal frequency is selected using a synthesizer control signal from a micro controller.

63. A method as claimed in claim 61, wherein the step of receiving the sample signal comprises a step of controlling a switching input adapted to selectively supply sample signals from one of a first and a second wideband signal path of the receiver.

64. A method as claimed in claim 61, wherein the step of isolating signals within the pass-band comprises a step of selectively attenuating a portion of the sample signal lying outside the narrow pass-band.

65. A method as claimed in claim 61, wherein the step of isolating signals within the pass-band comprises a step of selectively adjusting a bandwidth of the narrow pass-band.

* * * * *